Dec. 14, 1948. J. M. CALDWELL 2,456,110
INTERNAL-COMBUSTION ENGINE
Filed Aug. 17, 1946 5 Sheets-Sheet 1

INVENTOR:
JOSEPH M. CALDWELL.
BY
Liebner, Maltby & Beehler
ATTORNEYS.

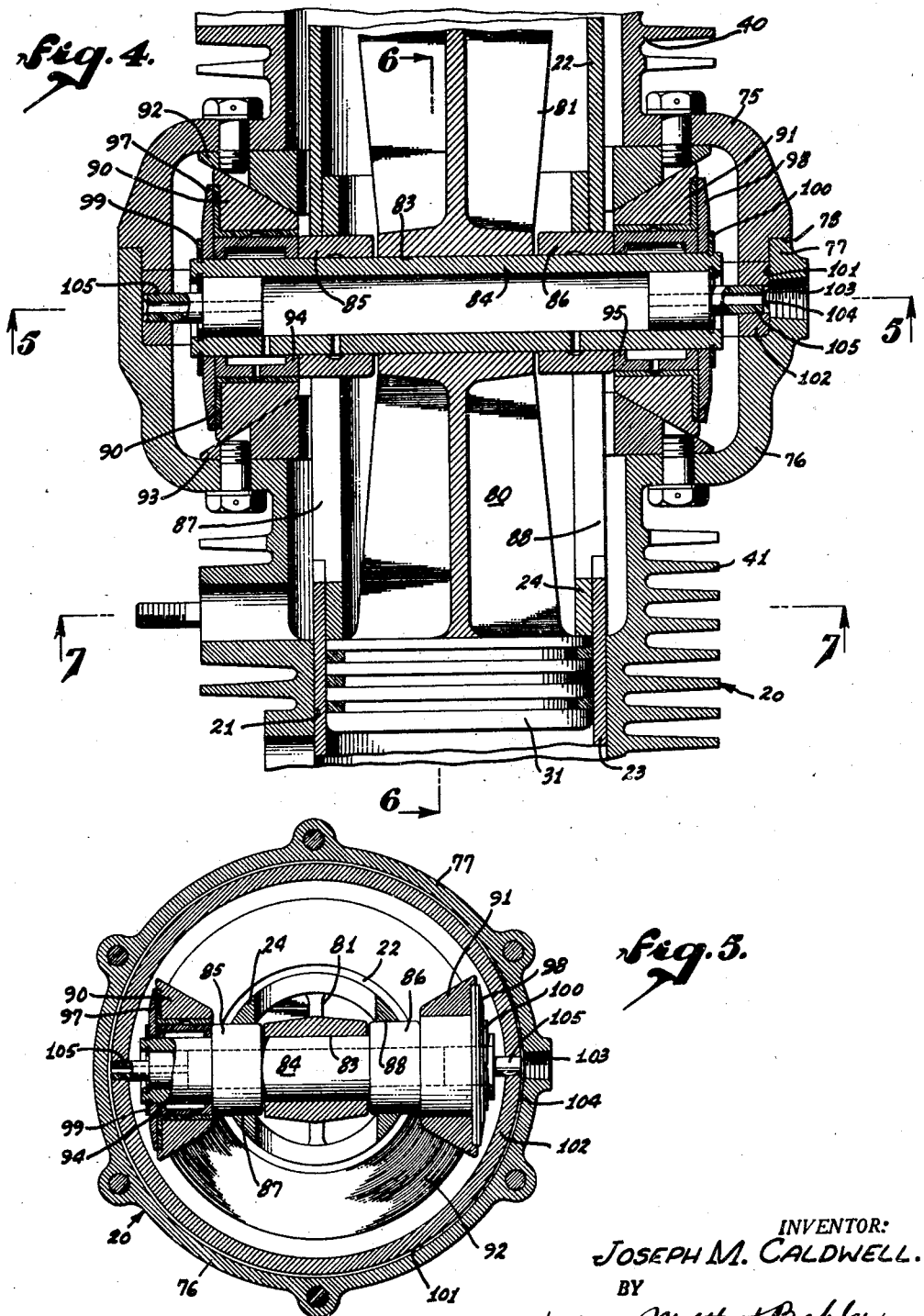

Dec. 14, 1948.   J. M. CALDWELL   2,456,110
INTERNAL-COMBUSTION ENGINE
Filed Aug. 17, 1946   5 Sheets-Sheet 3
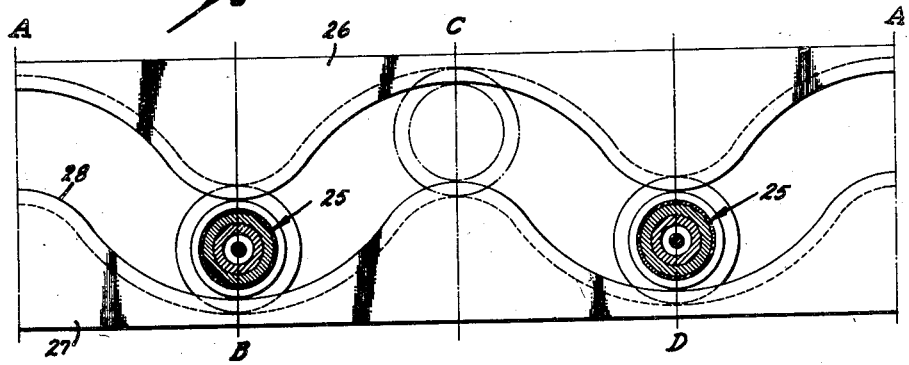
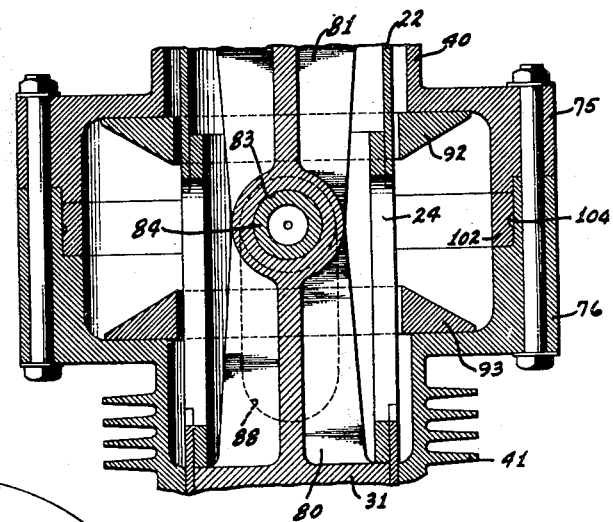
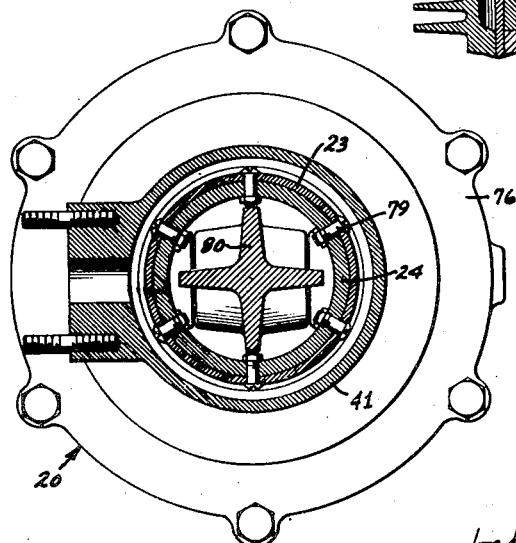
INVENTOR:
JOSEPH M. CALDWELL.
BY
Hebner, Maltby & Beehler
ATTORNEYS.

Dec. 14, 1948.         J. M. CALDWELL         2,456,110
                INTERNAL-COMBUSTION ENGINE
Filed Aug. 17, 1946                    5 Sheets—Sheet 4
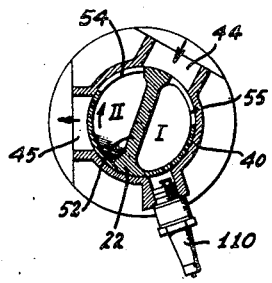
*fig.9.*
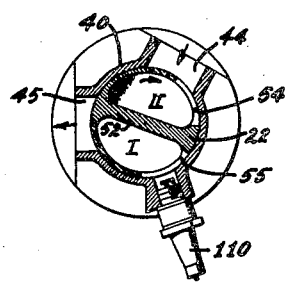
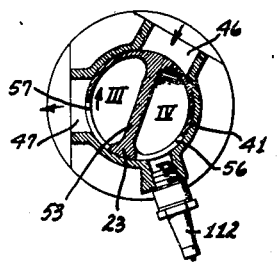
*fig.10.*
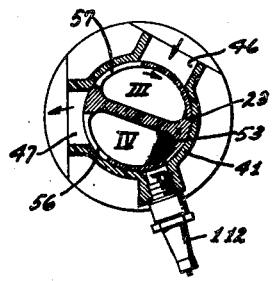
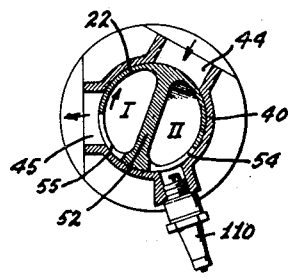
*fig.11.*
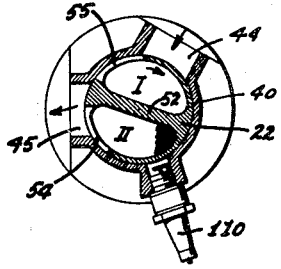
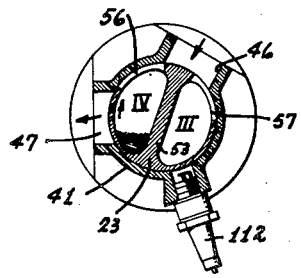
*fig.12.*
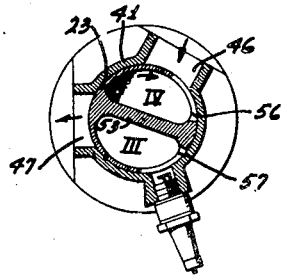
INVENTOR:
JOSEPH M. CALDWELL.
BY
Hebner, Maltby & Beehler
ATTORNEYS.

Dec. 14, 1948.  J. M. CALDWELL  2,456,110
INTERNAL-COMBUSTION ENGINE
Filed Aug. 17, 1946  5 Sheets-Sheet 5
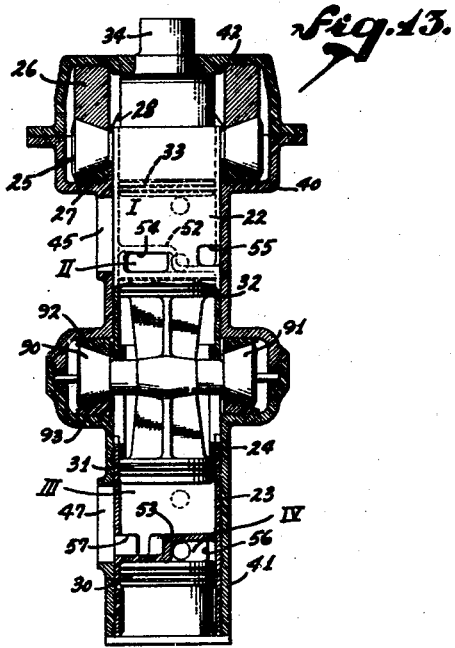
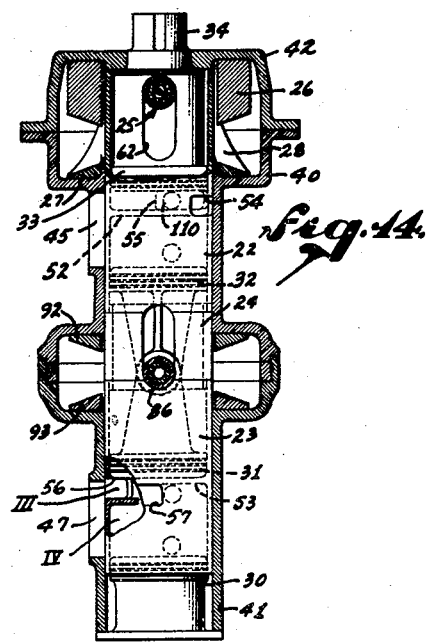
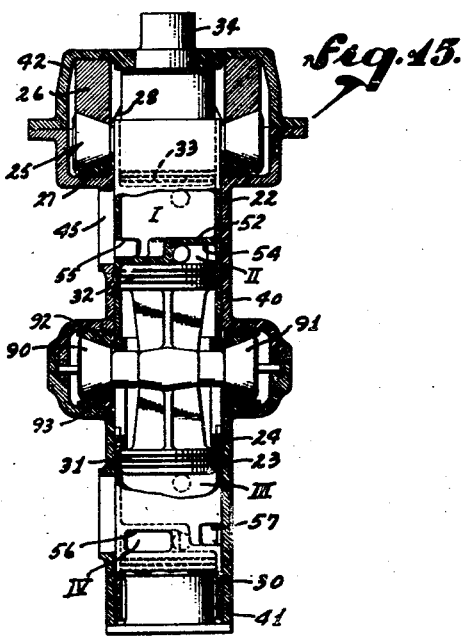
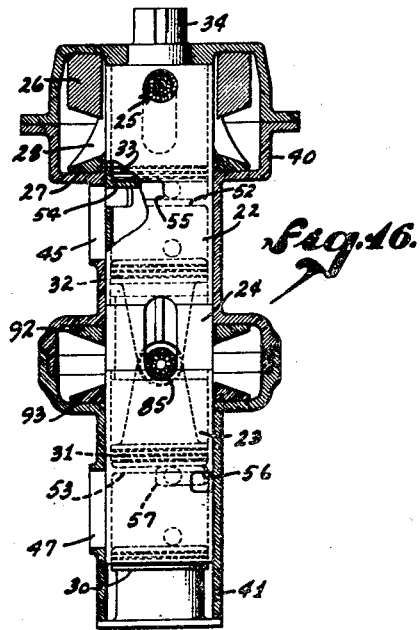
INVENTOR:
JOSEPH M. CALDWELL.
BY
Hebner, Matthy & Bechler
ATTORNEYS.

Patented Dec. 14, 1948

2,456,110

UNITED STATES PATENT OFFICE 2,456,110

INTERNAL-COMBUSTION ENGINE

Joseph M. Caldwell, Roscoe, Calif.

Application August 17, 1946, Serial No. 691,330

14 Claims. (Cl. 123—50)

My invention relates to internal combustion engines, and more particularly to a four-cycle, opposed piston, reciprocating sleeve type disclosed in my Patent No. 2,332,056.

An object of this invention is to provide an improved means for coupling two of the units disclosed in said United States Letters Patent 2,332,056, so that a smoother working unit may be produced.

The unit disclosed in my prior patent has one disadvantage in that a power thrust is delivered only twice in every four strokes. It is an object of this invention to provide an internal combustion engine of the type disclosed in said patent in which a power thrust is delivered four times in four strokes.

I am aware of the fact that a four cylinder, four cycle internal combustion engine using a crank shaft to translate reciprocatory motion into rotary motion accomplishes this purpose. It is, however, an object of this invention to accomplish this purpose without the use of any complex crank shafts, cam shafts, moving valves, or gears.

It is a further object of my invention to provide an improved coupling means for the engine disclosed in my Patent 2,332,056 or any related engine design where the main driving torque or gas pressure loads are transmitted through a sleeve or cylinder, or whose cycling action is dependent on a sleeve valve. My invention would eliminate the mechanism required for actuating of the sleeve of the added power unit.

An advantage of my invention is that two or more of the type power units described in my Patent No. 2,332,056 may be coupled together with a minimum of parts.

A further advantage is that with the varying cycle load of two units (four combustion chambers) being transmitted through the single conversion unit of a master power unit, a relatively smooth torque is obtained at the power take-off of the master unit. This action gives a low ratio of maximum to mean torque, which is desirous.

The mean and maximum bearing loads of the master power unit will be reduced and the mechanical efficiency increased. The combination of two power units creates an independent four-cycle engine with four combustion chambers. As the four cycles of operation are completed (as determined by the master unit) in one revolution, one cycle of each combustion chamber is completed for every 90° rotation, or one complete stroke of the sleeve. With an alternate cycling schedule for each combustion chamber for every 90° of rotation, there will always be one combustion chamber completing one of the four cycles of operation of the four-cycle principle. This would mean that at all times there would be a charge in one of the chambers being compressed. The kinetic energy to compress this charge would be absorbed by the sleeve assembly and would never be transmitted through the bearings of either the cam follower or drive couple of the master power unit. This would result in a decreased bearing load and increased efficiency.

Other and further objects and advantages will become apparent from the drawings and the specifications which follow.

In the drawings:

Figure 4 is an enlarged section showing a means for coupling the two units together.

Figure 5 is a section taken on line 5—5 of Figure 4.

Figure 6 is a section taken on line 6—6 of Figure 4.

Figure 7 is a section taken on line 7—7 of Figure 4.

Figure 8 is a schematic view of the cam.

Figure 9 is a transverse section showing the reciprocating sleeve at the beginning of the intake stroke of cylinder II; the beginning of the compression stroke of cylinder I, the beginning of the exhaust stroke of cylinder III; and the beginning of the power stroke of cylinder IV.

Figure 10 is a similar view showing the sleeve at the beginning of power stroke of cylinder I, the beginning of compression stroke of cylinder II; the beginning of the intake stroke of cylinder III; and the beginning of the exhaust stroke of cylinder IV.

Figure 11 is a similar view showing the sleeve at the beginning of the exhaust stroke of cylinder I, the beginning of the power stroke of cylinder II; the beginning of the compression stroke of cylinder III; and the beginning of the intake stroke of cylinder IV.

Figure 12 is a similar view showing the position of the sleeve at the beginning of the intake stroke of cylinder I; the beginning of the exhaust stroke of cylinder II; the beginning of the power stroke of cylinder III; and the beginning of the compression stroke of cylinder IV.

Figure 13 is a longitudinal section of the engine showing the sleeves in the same position as Figure 9.

Figure 14 is a similar view showing a position similar to Figure 10.

Figure 15 is a similar view showing a position similar to Figure 12.

Figure 16 is a similar view showing a position similar to Figure 12.

Figures 1, 2, 3:
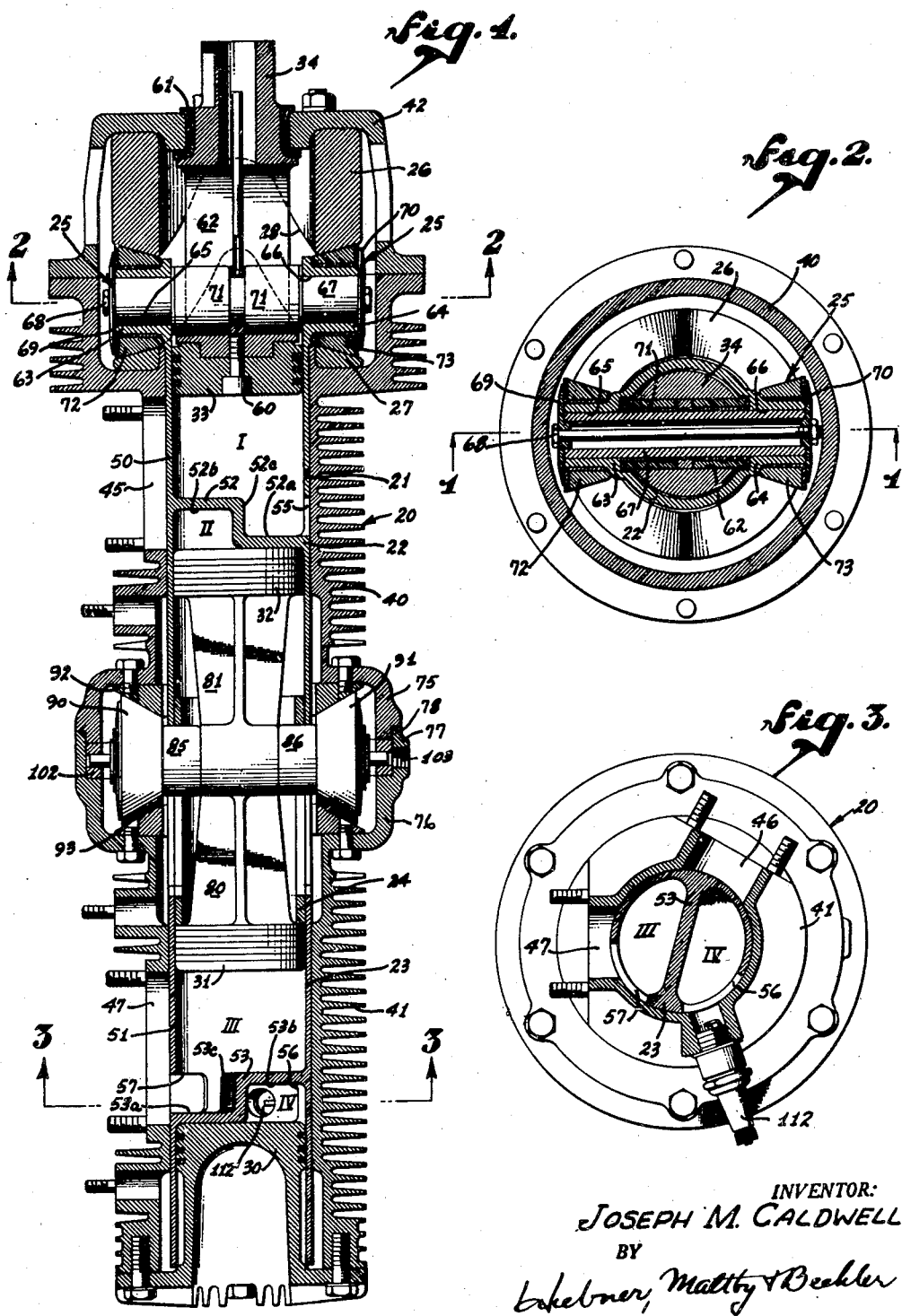
Figure 1 is a longitudinally sectional view of an engine embodying my invention taken on line 1—1 of Figure 2.
Figure 2 is a section taken through line 2—2 of Figure 1.
Figure 3 is a section taken on line 3—3 of Figure 1.

The embodiment of my invention as illustrated comprises a housing 20 formed with a longitudinal cylindrical bore 21, a pair of reciprocating and rotating members 22 and 23 securely connected together by a coupling sleeve 24 and disposed within the bore 21, a cam follower 25 securely mounted on the free end of the reciprocating member 22, a pair of complementary cams 26 and 27 disposed at one end of the housing 20 and defining a simple harmonic cam race 28, a stationary compression head 30 disposed in one end of the reciprocating member 23, and rigidly mounted to one end of the housing 20, a rotating, non-reciprocating compression head 31 disposed in the other end of the reciprocating member 23, a rotating non-reciprocating compression head 32 disposed in one end of the reciprocating member 22, a rotating, non-reciprocating compression head 33 disposed within the other end of the reciprocating member 22 and slidably connected to the cam follower 25 for rotation therewith, and means for employing the rotary motion of the head 33 illustrated as a shaft 34.

The housing 20 comprises a pair of longitudinally aligned cylinder blocks 40 and 41 connected together in the middle and enclosed at one end by compression head 30 and at the other end by a cam housing 42. Openings 44 and 45 are provided in the housing 40 to form intake and exhaust ports respectively. Similarly, openings 46 and 47 are provided in housing 41 to form intake and exhaust ports respectively. The exhaust and intake ports are illustrated as rectangular openings and are shown as extending substantially the full length of the stroke of the reciprocating members 22 and 23. However, these ports may be of other shapes, such, for example, as following the simple harmonic curve of the cam race 28 without departing from the spirit of my invention. It will readily be understood to those skilled in the art that the position, the length, and the width of the exhaust and intake ports may be varied to fit the valve timing requirement of any given design.

To the other end of sleeve 50, i. e. the upper end in Figure I, is securely fastened, by any suitable means, the cam follower 25. Figure 1 shows the cam follower as an integral part of sleeve 50.

The reciprocating members 22 and 23 comprise cylindrical sleeves 50 and 51 and diaphragms 52 and 53 dividing the sleeves 50 and 51 into combustion chambers I and II, and III and IV respectively. The cylindrical sleeves 50 and 51 are formed with openings 54, 55, 56 and 57, respectively, adjacent to the diaphragms 52 and 53. It will readily be seen and understood that, upon reciprocation, the members 22 and 23 are compelled to rotate because of the action of the cam follower 25 in the cam race 28, thereby causing the openings 54, 55, 56 and 57 to periodically register with ports 44, 45, 46 and 47 and to act as intake and exhaust valves.

The rotating shaft 34 is fastened to the rotating compression head 33 by bolt 60 and is secured in place in the housing 42 by thrust bearing 61. The shaft 34 is formed with a longitudinal slot 62. The cam follower 25 comprises a pair of diametrically opposed projections 63 and 64 formed with longitudinally aligned bores 65 and 66. A shaft 67 is disposed into the bores 65 and 66 and is held in place by a tie bolt 68 and washers 69 and 70. A cylindrical bearing 71 is disposed about the periphery of the shaft 67 and through the slot 62 of shaft 34. The cam follower 25 can therefore reciprocate but cannot rotate with respect to shaft 34. A pair of frustro-conical shaped bearings 72 and 73 are disposed on the ends of shaft 67 and are adapted to fit into and follow the cam race 28. It will readily be seen that the reciprocating motion of the members 22 and 23 is translated into a rotary motion of shaft 34.

The housings 40 and 41 are formed with enlarged end bells 75 and 76 respectively, which are fastened together by any suitable means such as the overlapping shoulder 77 and annular groove 78. Sleeves 22 and 23 are connected together by means of the coupling sleeve 24 and by means of bolts 79 (Figure 7). Compression heads 31 and 32 are fastened together by means of rods 80 and 81. For the sake of simplicity, compression heads 31 and 32 and connecting rods 80 and 81 are shown herein as an integral piece formed with a transverse bore 83 midway between the two compression heads. A hollow shaft 84 is disposed through the bore 83. Bearings 85 and 86 fit over shaft 84 and are disposed in longitudinal slots 87 and 88 of coupling sleeve 24, thus permitting sleeves 22 and 23 to reciprocate with respect to compression heads 31 and 32. The shaft 84 is restrained from reciprocation by means of a pair of circular thrust bearings 90 and 91. The thrust bearings 90 and 91 are held in position in the housing end bells 75 and 76 by means of the taper rings 92 and 93.

For the sake of simplicity in assembly, spacer rings 94 and 95 are secured over the opposite ends of the shaft 84. The shaft 84 is restrained against longitudinal movement by means of the end washers 97 and 98 which are secured to the shaft by means of snap rings 99 and 100. The end bell housings 75 and 76 are formed to provide an internal annular groove 101 into which is rotatably disposed an oil distributing ring 102. Oil enters the system through a tapped hole 103 into a groove 104 of the oil distributing ring 102 where it flows through a conduit 105 into hollow shaft 84.

It will readily be seen that sleeves 22 and 23 and coupling sleeve 24 may reciprocate and rotate while compression heads 31 and 32 rotate but do not reciprocate.

Further incidental details of the engine and further particulars of the relationship of certain parts will be described in connection with the operation of the engine.

The operation of my engine can best be understood by reference to Figures 9 to 16 inclusive. I shall describe the four-stroke operation of combustion chamber I only, it being understood that the operation of combustion chambers II, III and IV is identical and that the firing order is I, IV, III, II.

Figures 9 and 13 show the reciprocating member 23 at bottom center at the end of the intake stroke and the beginning of the compression stroke. As hereinafter used the terms "top center" and "bottom center" refer to the top and bottom of the simple harmonic curve defined by the cams 26 and 27 as schematically illustrated in Figure 8.

As the member 22 travels upward on the compression stroke the cam follower 25 moves in the cam race 28 from B to C (Figure 8) thereby causing the member 22 to rotate to a position where the opening 55 registers with a means of igniting the compressed charge such as a spark plug 110.

Figures 10 and 14 show the member 22 at the top center of the compression stroke. It will be understood that the timing of the spark plug 110 is such that it will fire ahead of top center in an amount determined by the particular design requirements. As the power stroke expands and the member 22 moves downward, the cam follower 25 moves from C to D, in the cam race 28 thereby causing the member 22 to rotate 90° and cause opening 55 to come into registry with exhaust port 45, as illustrated in Figures 11 and 15.

Figures 11 and 15 show the member 22 at the bottom center of the power stroke and at the beginning of the exhaust stroke. As the member 22 moves upward in the exhaust stroke, the cam follower 25 moves from D to A in the cam race 28, thereby causing the member 22 to rotate so that the opening 55 comes into registry with the intake port 44.

Figures 12 and 16 show the member 22 at the top center ending the exhaust stroke and beginning the intake stroke. As the member 22 moves downward, the cam follower 25 moves from A to B in the cam race 28, thereby completing the four cycles and returning the member 22 to the position shown in Figures 9 and 13.

It will be noted that the diaphragms 52 and 53 (Fig. 1) are formed by offsetting the opposite sides 52a and 52b and 53a and 53b and joining together said offset sides by walls 52c and 53c respectively. It is apparent that the diaphragms 52 and 53 could be formed either flat or any other desired shape.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

What I consider the essence of my invention is in an internal combustion engine of the opposed piston, reciprocating sleeve type, a means for coupling the reciprocating sleeves comprising a coupling sleeve formed with oppositely disposed longitudinal slots, a longitudinally rotatable shaft disposed through said slots and rotating, non-reciprocating pistons secured to said shaft.

It should be apparent to those skilled in the art that a slight modification in the details of construction will readily adapt my engine assembly and invention to be used as either a pumping unit or a combination internal combustion engine and pumping unit. In order to adapt this type engine to a pumping unit, it will be necessary to make the following changes: The spark plugs 110 and 112 should be removed and an exhaust port substituted therefore. An intake port should be placed between the last mentioned exhaust port and the exhaust port 45. Such a construction will give a complete change of air or fluid being pumped twice during each revolution of operation. It should be apparent to those skilled in the art that the position of the two intake and two exhaust ports will be placed at 90° to each other.

A further modification within the scope of my engine will be in adapting it to a jet propulsion engine. This may readily be done by changing the shape of the cam race 28 as schematically shown in Figure 8. The cam race now comprises a simple harmonic curve. By flattening the peaks of the curve and making the inclines sharply, it will readily be seen that the piston can be locked at the top of compression stroke and beginning of the power stroke thereby permitting the dissipation of the energy created through the exhaust manifold to give a jet propulsion effect rather than dissipated in expansion and movement of the piston. It will be obvious, of course, that a change in the position of exhaust port 45 will be necessary, that is, the exhaust port 45 should be moved immediately adjacent spark plug 110. Only such energy as is necessary for driving a supercharger and other auxiliary equipment need be dissipated in movement of sleeves 21 and 23, and rotation of the shaft 34.

Having described my invention, what I claim as new and desire to secure by Letters Patent is:

1. In an internal combustion engine of the opposed piston reciprocating sleeve type in which two combustion heads are located in the central region of the sleeve, the means for mounting said combustion heads in non-reciprocating, rotating relationship to said engine comprising diametrically opposed slots in said sleeve, a shaft traversing said slots, means non-reciprocally mounting said shaft, and rigid connecting means between said shafts and said combustion heads.

2. In an internal combustion engine of the opposed piston reciprocating sleeve type in which two combustion heads are located in the central region of the sleeve, the means for mounting said combustion heads in non-reciprocating, rotating relationship to said engine comprising diametrically opposed slots in said sleeve, a shaft traversing said slots means non-reciprocally mounting said shaft, said means comprising complementary bearing journals, bearing surfaces affixed to the outer extremity of said shaft, and slideably retained between said complementary bearing journals, and rigid connecting means between said shaft and said combustion heads.

3. In an internal combustion engine of the opposed piston reciprocating sleeve type in which two combustion heads are located in the central region of the sleeve, the means for mounting said combustion heads in non-reciprocating, rotating relationship to said engine comprising diametrically opposed slots in said sleeve, a shaft traversing said slots means non-reciprocally mounting said shaft, said means comprising complementary bearing journals, bearing surfaces rotatably affixed to the outer extremity of said shaft, and slideably retained between said complementary bearing journals, and rigid connecting means between said shaft and said combustion heads.

4. In an internal combustion engine of the opposed piston reciprocating sleeve type in which two combustion heads are located in the central region of the sleeve, the means for mounting said combustion heads in non-reciprocating, rotating relationship to said engine comprising diametrically opposed slots in said sleeve, a shaft traversing said slots means non-reciprocally mounting said shaft, said means comprising complementary bearing journals, frustro-conically shaped bearing surfaces affixed to the outer extremity of said shaft, and slideably retained between said complementary bearing journals, and rigid connecting means between said shaft and said combustion heads.

5. In an internal combustion engine of the opposed piston reciprocating sleeve type in which two combustion heads are located in the central region of the sleeve, the means for mounting said combustion heads in non-reciprocating, rotating relationship to said engine comprising diametrically opposed slots in said sleeve, a shaft traversing said slots, means non-reciprocally, axially-rotatably mounting said shaft, and rigid connecting means between said shafts and said combustion heads.

6. In an internal combustion engine of the opposed piston, reciprocating sleeve type in which two combustion heads are located in the central region of the sleeve, the means for mounting said combustion head in non-reciprocating rotating relationship to said engine, comprising diametrically opposed slots in said sleeve, a shaft traversing said slots, means non-reciprocally mounting said shaft, said means comprising complementary bearing journals, bearing surfaces affixed to the outer extremity of said shaft and slideably retained between said complementary bearing journals; said bearing journals being in fixed association with the housing of said engine.

7. Means for mounting rotatable non-reciprocating members in the central region of a reciprocating rotating cylindrical member, said means comprising diametrically opposed slots, a shaft traversing said slots, means for non-reciprocally mounting said shaft, said means comprising bearing surfaces affixed to the outer extremity of said shaft and slideably restrained between complementary bearing journals.

8. An internal combustion engine comprising a housing having a cylindrical base, intake, ignition and exhaust ports in the wall of said housing, a sleeve mounted for reciprocal and rotational movement within the base of said housing, and said sleeve being formed with two diaphragms and having an opening on each side of each of said diaphragms adapted upon rotation of the sleeve to periodically register with the intake, ignition and exhaust ports, four compression heads within the sleeve and supported against reciprocal motion and cooperating with the diaphragms and sleeve to form combustion chambers whereby successive explosions in the combustion chambers cause reciprocal movement of the sleeve, means for translating such reciprocal movement of said sleeve into simultaneous rotary motive thereof, and a coupling with said means for taking off the torque, said means comprising a stationary cam race formed by complementary cams, and a cam follower operating in said cam race and coupled with said sleeve.

9. An internal combustion engine comprising: a housing having a cylindrical bore, intake, ignition and exhaust ports in the wall of said housing, a sleeve mounted for reciprocal and rotational movement within the base of said housing, and said sleeve mounted for reciprocal and rotational movement within the bore of said housing, and said sleeve being formed with two diaphragms and having an opening on each side of said diaphragms adapted upon rotation of the sleeve to periodically register with the intake, ignition and exhaust ports, a compression head in each end of said sleeve and supported against reciprocal movement and two compression heads disposed in the central region of said sleeve and supported against reciprocation and cooperating with the diaphragms and sleeve to form combustion chambers whereby successive explosions in the combustion chambers cause reciprocal movement of the sleeve, means for translating such reciprocal movement of said sleeve into simultaneous rotary motion thereof, and a coupling with said means for taking off the torque, said means comprising a stationary cam race formed by complementary cams, and a cam follower operating in said cam race and coupled with said sleeve.

10. An internal combustion engine comprising: a housing having a cylindrical bore, intake, ignition and exhaust ports in the wall of said housing, a sleeve mounted for reciprocal and rotational movement within the base of said housing, and said sleeve mounted for reciprocal and rotational movement within the bore of said housing, and said sleeve being formed with two diaphragms and having an opening on each side of said diaphragms adapted upon rotation of the sleeve to periodically register with the intake, ignition and exhaust ports, a compression head in each end of said sleeve and supported against reciprocal movement and means for non-reciprocally supporting two compression heads in the central region of said sleeve and cooperating with the diaphragms and sleeve to form combustion chambers whereby successive explosions in the combustion chambers cause reciprocal movement of the sleeve, means for translating such reciprocal movement of said sleeve into simultaneous rotary motion thereof, and a coupling with said means for taking off the torque, said means comprising a stationary cam race formed by complementary cams, and a cam follower operating in said cam race and coupled with said sleeve.

11. An internal combustion engine comprising: a housing having a cylindrical bore, intake, ignition and exhaust ports in the wall of said housing, a sleeve mounted for reciprocal and rotational movement within the base of said housing, and said sleeve mounted for reciprocal and rotational movement within the bore of said housing, and said sleeve being formed with two diaphragms and having an opening on each side of said diaphragms adapted upon rotation of the sleeve to periodically register with the intake, ignition and exhaust ports, a compression head in each end of said sleeve and supported against reciprocal movement and means for non-reciprocally supporting two compression heads in the central region of said sleeve said means comprising diametrically opposed slots in said sleeve, a shaft traversing said slot, means for non-reciprocally mounting said shaft, and rigid connecting means between said shaft and said combustion heads and cooperating with the diaphragms and sleeve to form combustion chambers whereby successive explosions in the combustion chambers cause reciprocal movement of the sleeve, means for translating such reciprocal movement of said sleeve into simultaneous rotary motion thereof, and a coupling with said means for taking off the torque, said means comprising a stationary cam race formed by complementary cams, and a cam follower operating in said cam race and coupled with said sleeve.

12. An internal combustion engine comprising: a housing having a cylindrical bore, intake, ignition and exhaust ports in the wall of said housing, a sleeve mounted for reciprocal and rotational movement within the base of said housing, and said sleeve mounted for reciprocal and rotational movement within the bore of said housing, and said sleeve being formed with two diaphragms and having an opening on each side of said diaphragms adapted upon rotation of the sleeve to periodically register with the intake, ignition and exhaust ports, a compression head in each end of said sleeve and supported against reciprocal movement and means for non-reciprocally supporting two compression heads in the central region of said sleeve said means comprising diametrically opposed slots in said sleeve, a shaft traversing said slot, means non-reciprocally mounting said shaft, said means comprising bearing surfaces affixed to the outer extremity of said shaft and slideably retained between complementary bearing journals, and rigid connecting means between said shaft and said combustion heads and cooperating with the diaphragms and sleeve to form combustion chambers whereby successive explosions in the combustion chambers cause reciprocal movement of the sleeve, means for translating such reciprocal movement of said sleeve into simultaneous rotary motion thereof, and a coupling with said means for taking off the torque, said means comprising a stationary cam race formed by complementary cams, and a cam follower operating in said cam race and coupled with said sleeve.

13. In an internal combustion engine of the opposed piston, reciprocating sleeve type in which two combustion heads are located in the central region of the sleeve, said sleeve comprising two cylindrical members rigidly joined by a coupling sleeve, the means for mounting said combustion head in non-reciprocating relationship to said sleeve, comprising diametrically opposed slots in said sleeve, a shaft traversing said slots, means non-reciprocally mounting said shaft, and rigid connecting means between said shaft and said combustion heads.

14. Means for mounting rotatable non-reciprocating members in the central region of a reciprocating rotating cylindrical member, said means comprising diametrically opposed slots, a shaft traversing said slots, said shaft being non-reciprocally mounted for free rotation in a plane perpendicular to the axis of said cylindrical member, and rigid connecting means between said shaft and said non-reciprocating member.

JOSEPH M. CALDWELL.

REFERENCES CITED

The following references are of record in the file of this patent:

UNITED STATES PATENTS

| Number | Name | Date |
|---|---|---|
| 855,256 | Morey | May 28, 1907 |
| 1,329,514 | Dusoevoir et al. | Feb. 3, 1920 |
| 1,498,216 | Wade | June 17, 1924 |
| 1,745,821 | Von Gribojedoff | Feb. 4, 1930 |

FOREIGN PATENTS

| Number | Country | Date |
|---|---|---|
| 131,632 | Great Britain | 1919 |